(12) United States Patent
Kim

(10) Patent No.: US 7,258,098 B2
(45) Date of Patent: Aug. 21, 2007

(54) VEHICLE MOUNTED TYPE FUEL TESTING APPARATUS

(75) Inventor: Ki Ho Kim, Anyang-si (KR)

(73) Assignee: Korea Institute of Petroleum Quality, Kyunggi-do (KR)

( * ) Notice: Subject to any disclaimer, the term of this patent is extended or adjusted under 35 U.S.C. 154(b) by 0 days.

(21) Appl. No.: 11/485,560

(22) Filed: Jul. 11, 2006

(65) Prior Publication Data

US 2007/0012091 A1    Jan. 18, 2007

(30) Foreign Application Priority Data

| | | |
|---|---|---|
| Jul. 14, 2005 | (KR) | 10-2005-0063575 |
| Jul. 14, 2005 | (KR) | 20-2005-0020507 |
| May 26, 2006 | (KR) | 10-2006-0047792 |
| Jun. 19, 2006 | (KR) | 20-2006-0016478 |

(51) Int. Cl.
*F02B 13/10* (2006.01)
*F02B 13/00* (2006.01)

(52) U.S. Cl. ............... 123/198 D; 123/575; 73/61.48; 356/337

(58) Field of Classification Search ............ 123/198 D, 123/575; 73/61.41, 61.48; 356/337
See application file for complete search history.

(56) References Cited

U.S. PATENT DOCUMENTS

| | | | | |
|---|---|---|---|---|
| 3,383,190 A | * | 5/1968 | Weber et al. | 123/434 |
| 5,469,830 A | * | 11/1995 | Gonzalez | 123/515 |
| 5,517,427 A | * | 5/1996 | Joyce | 702/50 |

* cited by examiner

*Primary Examiner*—Mahmoud Gimie
(74) *Attorney, Agent, or Firm*—Abelman, Frayne & Schwab

(57) ABSTRACT

A vehicle mounted type fuel testing apparatus comprises a fuel chamber; a first fuel pump for supplying fuel in the fuel chamber to a sample holding container and an auxiliary fuel tank; an analyzing device for analyzing constituents of the fuel accommodated in the fuel chamber; the auxiliary fuel tank for storing the fuel when it is determined that the fuel is normal fuel; the sample holding container for keeping the fuel when it is determined that the fuel is not normal fuel; a second fuel pump for supplying the fuel in the auxiliary fuel tank to a main fuel tank when the fuel is normal fuel; a third fuel pump for supplying the fuel in the auxiliary fuel tank to the outside when the fuel is not normal fuel; and a controller for controlling the above component parts.

4 Claims, 3 Drawing Sheets

VEHICLE MOUNTED TYPE FUEL TESTING APPARATUS

BACKGROUND OF THE INVENTION

1. Field of the Invention

The present invention relates, in general, to an apparatus for testing whether a fuel sold at a gas station is normal fuel and, more particularly, to a vehicle mounted type fuel testing apparatus which samples a portion of a fuel such as gasoline sold at a gas station and analyzes the constituents of the fuel using a UV (ultraviolet) spectrophotometer and/or an NIR (near infrared) spectrophotometer mounted to a vehicle, thereby determining whether the fuel sold at the gas station is normal fuel or not.

2. Description of the Prior Art

These days, as the price of oil goes up due to the oil crisis, a blended fuel has been used as a kind of alternative fuel. In the case of this blended fuel, since it is cheap and can be sold without generating a tax record, it is often the case that the blended fuel is abnormally sold at a gas station as if it were normal fuel. In order to supervise this transaction, it is necessary to sample the fuel sold at the gas station, test the fuel and determine whether the fuel is normal fuel. When it is determined that the fuel is a blended fuel, by banning the sale of the blended fuel, the use of the blended fuel can be prevented.

Generally, in the case of fuel sold at a gas station, in order to prevent the illegal intrusion of inexpensive petroleum products onto the market, it was obliged to add a marker of no less than a predetermined concentration into light oil-related oil products such as kerosene, a byproduct fuel, and the like, used in a vehicle. The light oil-related oil products having the marker added thereto are thus caused to emit a color, and then the spectrum of the color is analyzed using a UV spectrophotometer so as to test for the presence of the marker and identify the light-oil related oil product. Also, an NIR spectrophotometer used to determine the appropriateness of the fuel simultaneously measures the contents of aromatic compound, carbon, alcohol and benzel toluene and an octane number in the case of gasoline, and density, kinematic viscosity, distillation and a cetane number in the case of a light oil-related oil product, using a near infrared spectrum. The NIR spectrophotometer uses an improved indirect measurement method wherein, after the spectrum of a fuel sample from a vehicle is measured to be tested, the above-described items are calculated based on an already established calibration model using a computer depending upon spectrum absorptivity in a specific wavelength range.

For this measurement, in the conventional art, fuel is sampled from a gas station, and the constituents of the fuel are analyzed in a separate measurement room using the UV spectrophotometer and/or the NIR spectrophotometer to determine whether the fuel sold at the gas station is normal fuel or a blended fuel.

However, in order to test the fuel sample in the measurement room, a necessary amount of fuel must be purchased from the gas station. In this regard, under the law in force, the general public can purchase gasoline or light oil used in a Diesel vehicle only for the purpose of driving a car. Therefore, in order to obtain a fuel sample for the purpose of testing, it must be disclosed that the fuel sample will be used for analysis of its constituents. Therefore, in this case, because a gas station attendant will supply normal fuel instead of a blended fuel, it is difficult to attain the goal of preventing the use of the blended fuel.

SUMMARY OF THE INVENTION

Accordingly, the present invention has been made keeping in mind the above problems occurring in the prior art, and an object of the present invention is to provide a vehicle mounted type fuel testing apparatus which samples an amount of fuel while the fuel is supplied to a vehicle and analyzes the constituents of the fuel in real time on the spot to determine whether the fuel is normal fuel, thereby shortening the fuel testing time and enabling on-the-spot control of the use of a blended fuel.

Another object of the present invention is to provide a vehicle mounted type fuel testing apparatus which can motivate a gas station owner to prevent the sale of a blended fuel at the outset.

In order to achieve the above objects, according to the present invention, there is provided a vehicle mounted type fuel testing apparatus comprising a fuel chamber installed between a fuel filler opening and a main fuel tank of a vehicle; a first fuel pump for supplying fuel in the fuel chamber to a sample holding container and an auxiliary fuel tank; an analyzing device for analyzing constituents of the fuel accommodated in the fuel chamber; the auxiliary fuel tank for storing the fuel when it is determined from measurements obtained by the analyzing device that the fuel is normal fuel; the sample holding container for keeping the fuel when it is determined from the measurements obtained by the analyzing device that the fuel is not normal fuel; a three-way valve for selectively directing the fuel in the fuel chamber to the sample holding container or the auxiliary fuel tank; a second fuel pump for supplying the fuel in the auxiliary fuel tank to the main fuel tank when the fuel in the auxiliary fuel tank is normal fuel; a third fuel pump for supplying the fuel in the auxiliary fuel tank to the outside when the fuel in the auxiliary fuel tank is not normal fuel; and a controller for controlling the above component parts.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Reference will now be made in greater detail to preferred embodiments of the invention, examples of which are illustrated in the accompanying drawings. It is to be understood that the present invention can be realized in a variety of different configurations and is not limited to the illustrated embodiments.

Figure 1:
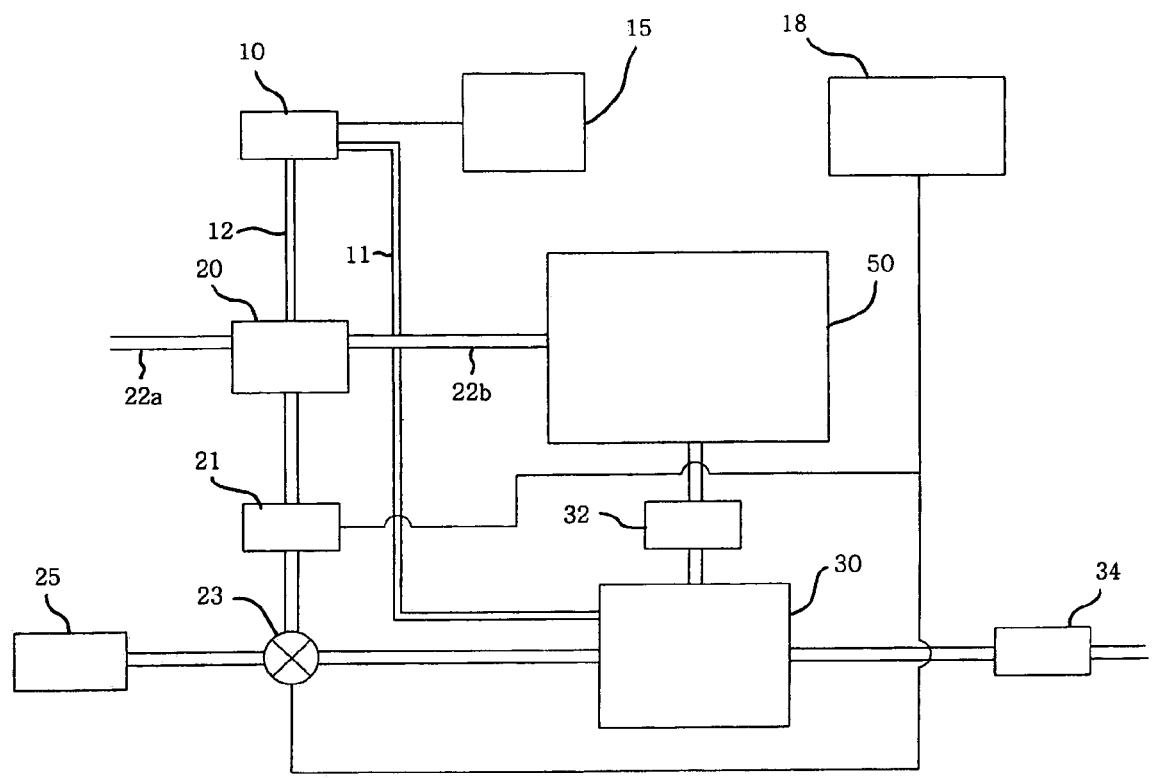
FIG. 1 is a diagrammatic view illustrating the construction of a vehicle mounted type fuel testing apparatus in accordance with a first embodiment of the present invention.
Figure 3:
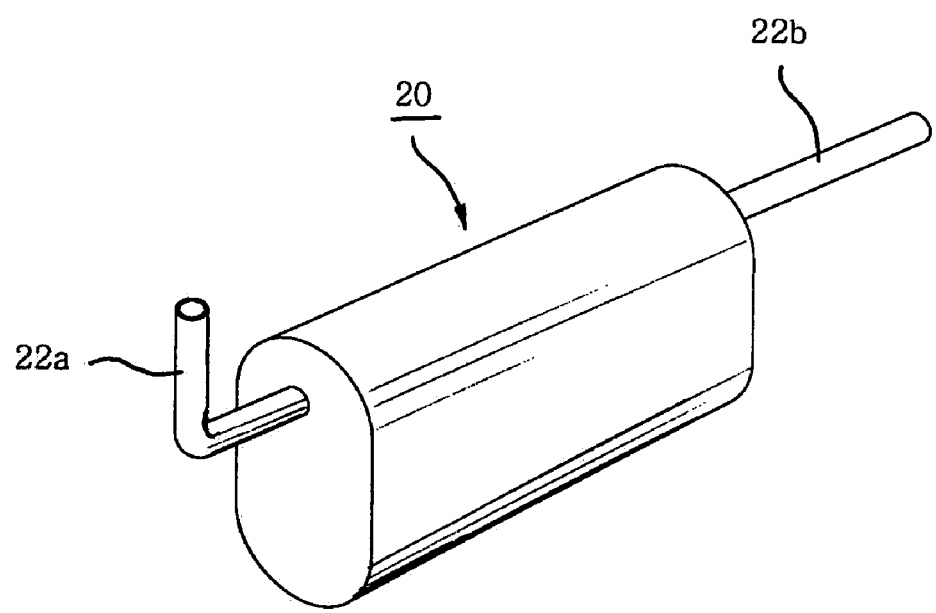
FIG. 3 is a perspective view illustrating a fuel chamber used in the vehicle mounted type fuel testing apparatuses in accordance with the first and second embodiments of the present invention.

First, the construction of a vehicle mounted type fuel testing apparatus in accordance with a first embodiment of the present invention which is applied to a gasoline vehicle will be described below with reference to FIG. 1. A first fuel pump 21 is installed on a fuel chamber 20 which is arranged in a fuel path extending between the fuel filler opening and the main fuel tank 50 of a vehicle. The first fuel pump 21 selectively supplies completely analyzed fuel to a sample holding container 25 or an auxiliary fuel tank 30. In particular, the fuel chamber 20 has a rectangular configuration as shown in FIG. 3. The fuel chamber 20 is formed with a fuel inlet 22a and a fuel outlet 22b at the upper portion thereof so that the fuel can be introduced into and discharged out of the fuel chamber 20 through the upper portion of the fuel chamber 20. The fuel introduced into the fuel chamber 20 through the fuel inlet 22a is accommodated in the lower portion of the fuel chamber 20.

A portion of the fuel accommodated in the fuel chamber 20 is transmitted through a hose 12 to an analyzing device 10 for analyzing the constituents of the fuel. The analyzing device 10 comprises a measurement unit which simultaneously measures the contents of aromatic compound, carbon, alcohol and benzel toluene and an octane number using an NIR (near infrared) spectrum by an NIR spectrophotometer, and a display 15 for visibly checking the measurements obtained by the measurement unit. The display 15 may comprise the monitor of a portable computer.

The fuel supplied by the first fuel pump 21 is selectively directed to the sample holding container 25 or the auxiliary fuel tank 30 by a three-way valve 23 which is installed in a fuel supply path. The fuel in the auxiliary fuel tank 30 is supplied to the main fuel tank 50 by a second fuel pump 32 when it is determined that the fuel in the auxiliary fuel tank 30 is normal fuel. If it is determined that the fuel in the auxiliary fuel tank 30 is unordinary blended fuel, a third fuel pump 34 is operated to discharge the fuel in the auxiliary fuel tank 30 to the outside.

The above-described component parts are positioned in the trunk of the vehicle, and a controller 18 for controlling those component parts is installed such that it can be viewed from a driver's seat.

Figure 2:
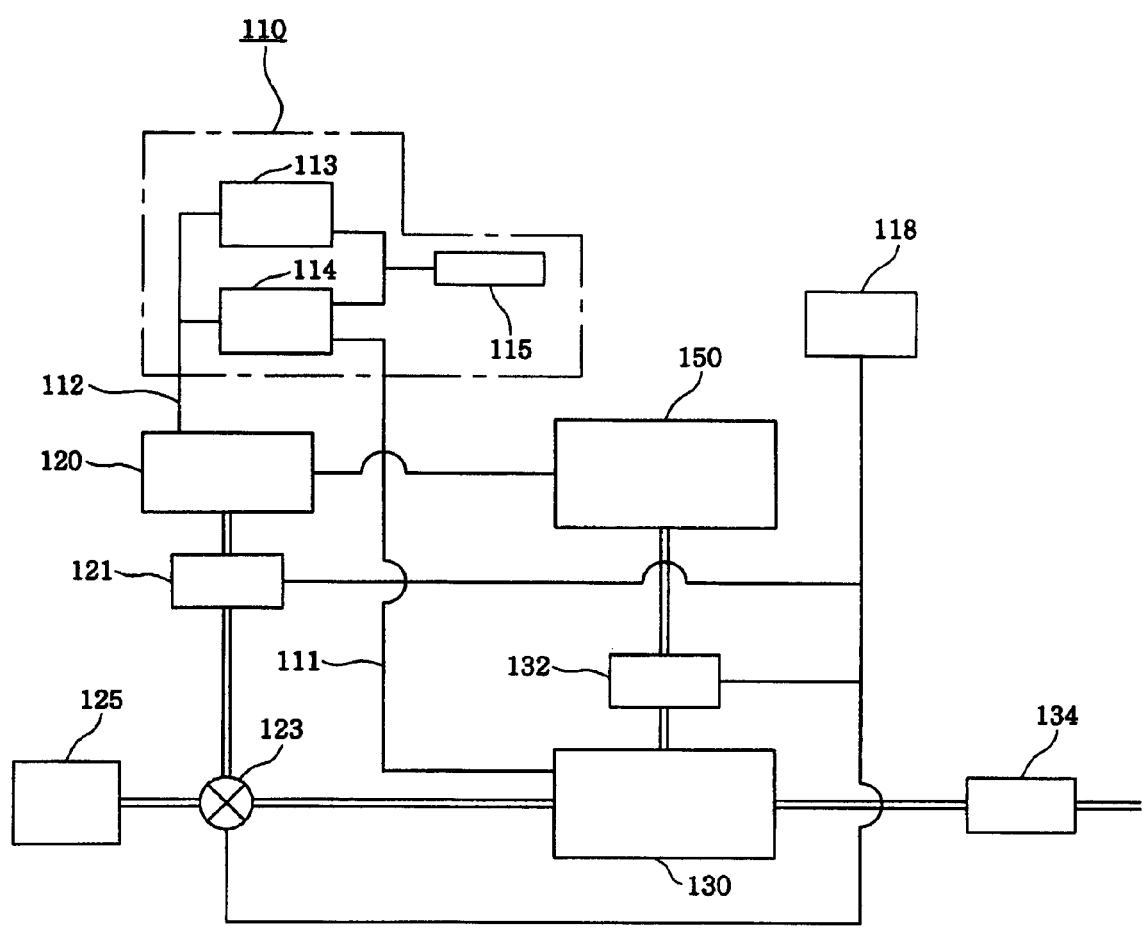
FIG. 2 is a diagrammatic view illustrating the construction of a vehicle mounted type fuel testing apparatus in accordance with a second embodiment of the present invention.

Next, the construction of a vehicle mounted type fuel testing apparatus in accordance with a second embodiment of the present invention which is applied to a Diesel vehicle will be described below with reference to FIG. 2. As in the first embodiment, a first fuel pump 121 is installed on a fuel chamber 120 which is arranged in a fuel path extending between the fuel filler opening and the main fuel tank 150 of a vehicle. The first fuel pump 121 selectively supplies completely analyzed fuel to a sample holding container 125 or an auxiliary fuel tank 130.

A portion of the fuel accommodated in the fuel chamber 120 is transmitted through a hose 112 to an analyzing device 110 for analyzing the constituents of the fuel. The analyzing device 110 comprises an ultraviolet (UV) spectrophotometer 113 for measuring the spectrum of a coloring agent contained in the fuel, an NIR (near infrared) spectrophotometer 114 for simultaneously measuring density, kinematic viscosity, distillation and a cetane number of the fuel using an NIR spectrum, and a display 115 for visibly checking the measurements obtained by the spectrophotometers 113 and 114.

When it is determined from the measurements obtained by the analyzing device 110 that the fuel is normal fuel, the fuel supplied from the fuel chamber 120 by the first fuel pump 121 is supplied to the auxiliary fuel tank 130 through a three-way valve 123 which is installed in a fuel supply path. When it is determined from the measurements obtained by the analyzing device 110 that the fuel is not normal fuel, the fuel accommodated in the fuel chamber 120 is supplied to the sample holding container 125. Also, the fuel in the auxiliary fuel tank 130 is supplied to the main fuel tank 150 by a second fuel pump 132 when it is determined that the fuel in the auxiliary fuel tank 130 is normal fuel. If it is determined that the fuel in the auxiliary fuel tank 130 is an unordinary blended fuel, a third fuel pump 134 is operated to discharge the fuel in the auxiliary fuel tank 130 to the outside.

Similarly, the above-described component parts are positioned in the trunk of the vehicle, and a controller 118 for controlling those component parts is installed such that it can be viewed from the driver's seat.

In the above-descried first embodiment of the present invention, when fuel is supplied at a gas station through the fuel filler opening of a gasoline vehicle which is equipped with the present apparatus, the fuel supplied through the fuel filler opening is delivered to the main fuel tank 50 through the fuel chamber 20. At this time, due to the fact that the fuel chamber 20 has a rectangular configuration and the fuel inlet 22a and the fuel outlet 22b are formed on the upper portion of the fuel chamber 20, the delivered fuel is accommodated in the lower portion of the fuel chamber 20.

In this state, in order to determine whether the delivered fuel is normal fuel, the constituents of the fuel are analyzed. As a portion of the fuel accommodated in the lower portion of the fuel chamber 20 is transmitted to the analyzing device 10 through the hose 12, the analyzing device 10 analyzes and tests the constituents of the fuel which is transmitted thereto through the hose 12. Since the procedure for simultaneously measuring a flash point, kinematic viscosity, specific gravity and a cetane number of the fuel using an NIR spectrum by the NIR spectrophotometer is well known in the art, the detailed description thereof will be omitted herein. The analyzed measurements are displayed on the monitor 15 provided to a driver's seat to be checked by an examiner. The completely analyzed fuel is supplied to the auxiliary fuel tank 30 through a hose 11.

If it is determined that the fuel analyzed through the above-described course is normal fuel, the first fuel pump 21 installed on the fuel chamber 20 is operated to supply the fuel in the fuel chamber 20 to the auxiliary fuel tank 30. At this time, a signal is applied from the controller 18 to the three-way valve 23 to control the three-way valve 23 such that the fuel flows from the fuel chamber 20 to the auxiliary fuel tank 30.

However, if it is determined that the fuel analyzed through the above-described course is not normal fuel but a blended fuel, the controller 18 controls the three-way valve 23 such that the fuel flows from the fuel chamber 20 to the sample holding container 25 to be used as evidence. When the sample holding container 25 is filled with the fuel, the controller 18 applies a signal to the three-way valve 23 to control the three-way valve 23 such that the fuel flow again from the fuel chamber 20 to the auxiliary fuel tank 30.

If the fuel accommodated in the auxiliary fuel tank 30 is normal fuel, the fuel in the auxiliary fuel tank 30 is supplied to the main fuel tank 50 by the second fuel pump 32, and if the fuel accommodated in the auxiliary fuel tank 30 is a blended fuel, the fuel in the auxiliary fuel tank 30 is supplied to the outside by the third fuel pump 34.

In this way, one testing cycle for a gasoline vehicle is completed, and after that, the examiner can move the vehicle to a subsequent gas station to repeat the testing cycle.

Also, in the case of a Diesel vehicle which is equipped with the apparatus in accordance with the second embodiment of the present invention, in order to determine whether the fuel sold at a gas station is normal fuel, the constituents of the fuel are analyzed. As a portion of the fuel accommodated in the lower portion of the fuel chamber 120 is transmitted to the analyzing device 110 through the hose 112, the analyzing device 110 analyzes and tests the constituents of the fuel which is transmitted thereto through the hose 112. At this time, in the case of normal fuel sold at a gas station, in order to prevent the illegal intrusion of inexpensive petroleum products onto the market, it was obliged to add a marker of no less than a predetermined concentration into light oil-related oil products such as kerosene, byproduct fuel, and the like, used in a vehicle. Therefore, the UV spectrophotometer 113 analyzes the spectrum of the marker contained in the fuel transmitted thereto, determines whether the marker is one contained in normal fuel, and displays the determination result on the monitor 115.

When the UV spectrophotometer 113 analyzes the spectrum of the marker contained in the fuel transmitted thereto, the NIR spectrophotometer 114 simultaneously measures density, kinematic viscosity, distillation and the cetane number of the fuel transmitted thereto using the near infrared spectrum, and displays the measurement result on the monitor 115 provided to the driver's seat to be checked by the examiner. The completely analyzed fuel is supplied to the auxiliary fuel tank 130 through a hose 111.

If it is determined that the fuel analyzed through the above-described course is normal fuel, the first fuel pump 121 installed on the fuel chamber 120 is operated to supply the fuel in the fuel chamber 120 to the auxiliary fuel tank 130. At this time, a signal is applied from the controller 118 to the three-way valve 123 to control the three-way valve 123 such that the fuel flows from the fuel chamber 120 to the auxiliary fuel tank 130.

However, if it is determined that the fuel analyzed through the above-described course is not normal fuel but a blended fuel, the controller 118 controls the three-way valve 123 such that the fuel flows from the fuel chamber 120 to the sample holding container 125 to be used as evidence. When the sample holding container 125 is full of fuel, the controller 118 applies a signal to the three-way valve 123 to control the three-way valve 123 such that the fuel flows again from the fuel chamber 120 to the auxiliary fuel tank 130.

If the fuel accommodated in the auxiliary fuel tank 130 is normal fuel, the fuel in the auxiliary fuel tank 130 is supplied to the main fuel tank 150 by the second fuel pump 132, and if the fuel accommodated in the auxiliary fuel tank 130 is a blended fuel, the fuel in the auxiliary fuel tank 130 is supplied to the outside by the third fuel pump 134.

In this way, one testing cycle for a Diesel vehicle is completed, and after that, the examiner can move the vehicle to a subsequent gas station to repeat the testing cycle.

As is apparent from the above description, the vehicle mounted type fuel testing apparatus according to the present invention provides advantages in that, since an amount of fuel is sampled while the fuel is supplied to a vehicle and the constituents of the fuel are analyzed in real time on the spot to determine whether the fuel is normal fuel, a fuel testing time is shortened, on-the-spot control of the use of a blended fuel is enabled, and the sale of a blended fuel is prevented at the outset.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A vehicle mounted type fuel testing apparatus comprising:
    a fuel chamber installed between a fuel filler opening and a main fuel tank of a vehicle;
    a first fuel pump for supplying fuel in the fuel chamber to a sample holding container and an auxiliary fuel tank;
    an analyzing device for analyzing constituents of the fuel accommodated in the fuel chamber;
    the auxiliary fuel tank for storing the fuel when it is determined from measurements obtained by the analyzing device that the fuel is normal fuel;
    the sample holding container for keeping the fuel when it is determined from the measurements obtained by the analyzing device that the fuel is not normal fuel;
    a three-way valve for selectively directing the fuel in the fuel chamber to the sample holding container or the auxiliary fuel tank;
    a second fuel pump for supplying the fuel in the auxiliary fuel tank to the main fuel tank when the fuel in the auxiliary fuel tank is normal fuel;
    a third fuel pump for supplying the fuel in the auxiliary fuel tank to the outside when the fuel in the auxiliary fuel tank is not normal fuel; and
    a controller for controlling the above component parts.

2. The apparatus according to claim 1, wherein the fuel chamber is formed with a fuel inlet and a fuel outlet at an upper portion thereof so that the fuel introduced into the fuel chamber can be accommodated in a lower portion thereof.

3. The apparatus according to claim 1, wherein the analyzing device comprises an NIR spectrophotometer and a monitor for visibly checking measurements obtained by the NIR spectrophotometer.

4. The apparatus according to claims 1 or 3, wherein the analyzing device further comprises a UV spectrophotometer.

* * * * *